Jan. 18, 1938.  A. NAPOLILLO  2,106,057

COOKING TOOL

Filed July 11, 1936

INVENTOR.
Angelo Napolillo
BY Clarence E. Threedy
HIS ATTORNEY.

Patented Jan. 18, 1938

2,106,057

UNITED STATES PATENT OFFICE 2,106,057

COOKING TOOL

Angelo Napolillo, Chicago, Ill.

Application July 11, 1936, Serial No. 90,054

5 Claims. (Cl. 107—49)

This invention relates to certain novel improvements in a cooking tool, and has for its principal object the provision of an improved construction of this character which will be highly efficient in use and economical in manufacture.

Among the several objects of this invention is to provide a cooking tool of the character hereinafter described which will be of a portable nature, thereby facilitating the manual operation of the same.

A still further object of the invention resides in the provision of a tool of the character hereinafter described which embodies a structure of simplicity for expeditiously holding and cutting edibles such as ravioli, pies, and the like.

Other objects will appear hereinafter.

The invention consists in the novel combination and arrangement of parts to be hereinafter described and claimed.

The invention will be best understood by reference to the accompanying drawing showing the preferred form of construction, and in which.

Figure 1:
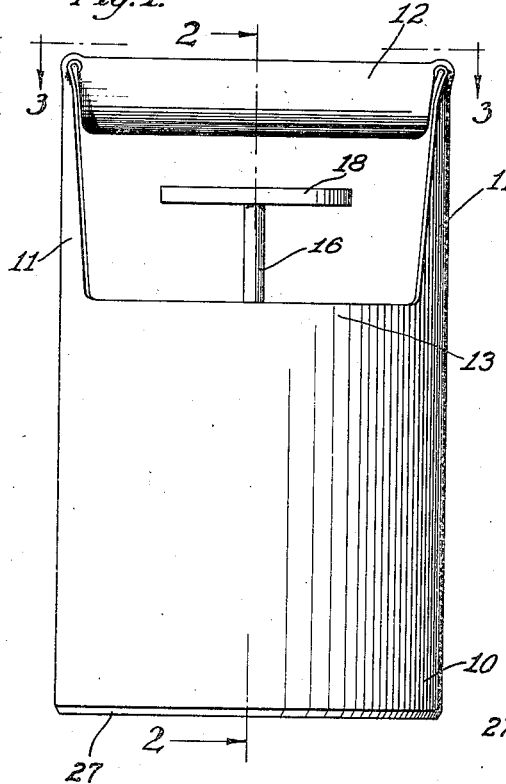
Fig. 1 is an elevational view of the invention.
Figure 2:
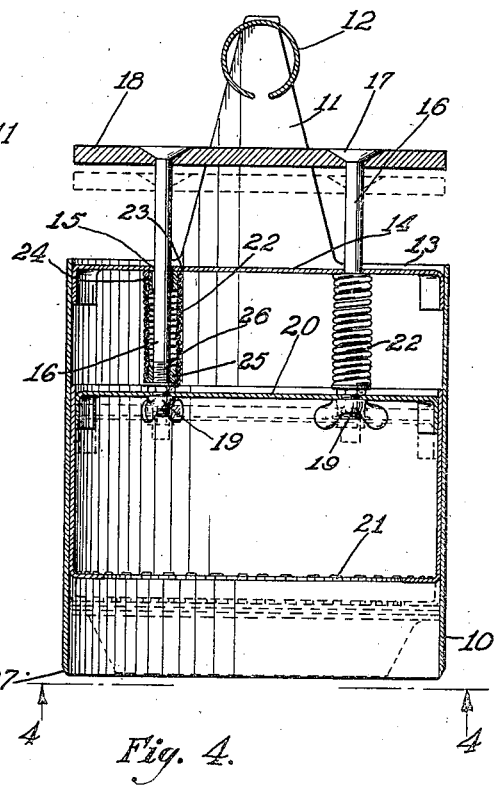
Fig. 2 is a sectional detail view of the same taken substantially on line 2—2 of Fig. 1.
Figures 3, 4:
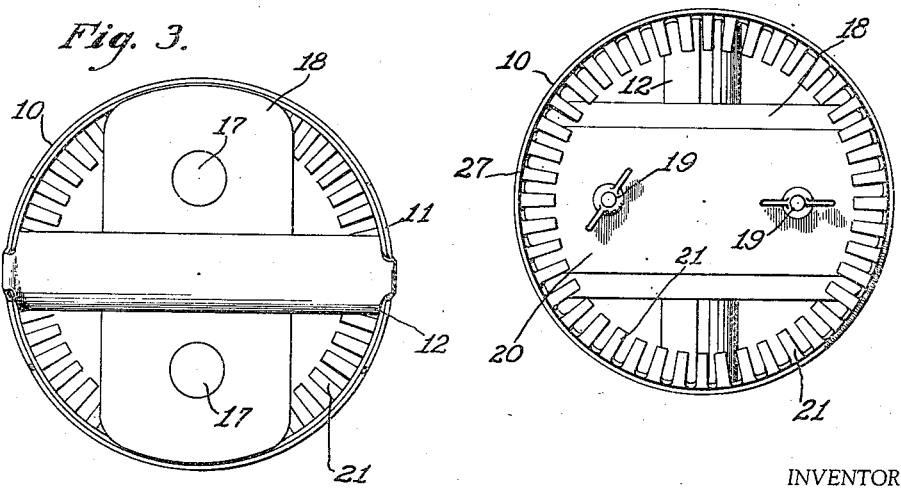
Fig. 3 is a top plan view of the same taken substantially on line 3—3 of Fig. 1.
Fig. 4 is a bottom plan view of the same taken substantially on line 4—4 of Fig. 2.

My improved cooking tool is especially designed for holding and cutting edibles such as ravioli, pie or the like, and is especially constructed so as to be hand operated.

To accomplish the many objects of the invention, I provide a form or mold 10 in the form of a cylindrical hollow bottom having upwardly extending arm portions 11 joined together by means of a handle 12. Positioned adjacent the upper end portion 13 of the mold or form is a bridge plate 14 having provided therein spaced openings 15 for the passage of plunger bolts 16. The upper corresponding end portions of these bolts 16 are connected as at 17 to a knuckle bearing plate 18 disposed beneath the handle 12.

The lower corresponding end portions of these bolts 16 are secured as at 19 to a mold 20. This mold 20 is slidably arranged within the form or mold 10, and the lower end portion thereof is provided with a plurality of spaced fingers 21 for reasons hereinafter set forth. This mold 20 is moved downwardly within the form or mold 10 against the action of the retraction springs 22 having corresponding end portions secured, as at 23, to nipples 24 carried by the bridge plate 14 and opposite end portions secured to a sleeve 25 threaded upon the bolts 16, as at 26.

The lower periphery of the mold or form 10 is provided with a knife edge as indicated at 27.

In operation, the user firmly grasps the handle 12 in his hand with his knuckles bearing against the plate 18. The form or mold 10 is placed upon the work, and after such placement, the mold 20 is moved into contact with the work by bearing the knuckles against the plate 18, thereby effecting movement of this mold and the plate 18 simultaneously against the action of the retraction springs 22.

When the mold 20 comes into contact with the work, the fingers 21 will engage the work and form scallops therein or press the layers of the work together by virtue of the pressure applied to the mold 20 by the action of the knuckles on the plate 18.

The device herein illustrated and described is of simple character, and will be found to be highly economical in use for the intended purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A cooking tool comprising a cylindrical form having a peripheral knife edge and upstanding arms, a handle connecting the ends of the arms together, a mold slidably arranged in the form and having a plurality of scallop forming fingers, spring means for retracting the mold within the form, a plate member having operative connection with the mold and disposed contiguous the handle whereby to receive the pressure of the hand of the operator when grasping the handle.

2. A cooking tool comprising a cylindrical form having a peripheral knife edge and upstanding arms, a handle connecting the ends of the arms together, a mold slidably arranged in the form, spring means for retracting the mold within the form, a plate member having operative connection with the mold and disposed contiguous the handle whereby to receive the pressure of the hand of the operator when grasping the handle.

3. A cooking tool comprising a sleeve-like form having a peripheral cutting edge at one end and having at its opposite end a pair of upstanding arms and a handle member extended therebetween in a manner to leave a space for the hand between said handle and the adjacent end of said form, a mould in the sleeve portion of said form and adapted to reciprocate therein below said handle, a presser plate attached to said mould for movement therewith and disposed in the aforesaid space between said handle and the corresponding end of the form so as to be engageable by movement of the hand downwardly from said handle whereby said mould may be moved toward said cutting edge of the form together with means normally and yieldingly positioning said mould inwardly of the form and away from said cutting edge.

4. A cooking tool comprising a sleeve-like form having a peripheral cutting edge at one end thereof and oppositely disposed cut-away portions forming opposite arms at the other end thereof, said arms being joined by an integral body portion extended laterally across the sleeve to form a handle, a mould slidable within said form and having attached thereto a knuckle bearing plate disposed below said handle for ready contact by the operator's hand from said handle together with spring means normally urging said bearing plate toward said handle and positioning said mould within said form and away from said cutting edge.

5. A device of the class described including a sleevelike form having a peripheral cutting edge and an opposite axial end portion and a sleevelike mold slidable within the form, together with means for manually reciprocating said mold within the form, said means consisting of a pair of diametrically spaced rod members extended parallel to the major axis of said mold through said axial end portion of the form, a lateral handle member attached to the outer ends of said rods, and spring means embracing said rods and normally adapted to position said mold within said sleeve and away from said cutting edge.

ANGELO NAPOLILLO.